United States Patent [19]

Di Rosa

[11] Patent Number: 5,081,337

[45] Date of Patent: Jan. 14, 1992

[54] DEVICE FOR WORKING ON SHEET METAL STRUCTURES

[75] Inventor: Gaetano Di Rosa, Pino Torinese, Italy

[73] Assignee: Fata Automation S.p.A., Italy

[21] Appl. No.: 429,220

[22] Filed: Oct. 31, 1989

[30] Foreign Application Priority Data

Nov. 8, 1988 [IT] Italy ................ 22546 A/88

[51] Int. Cl.⁵ .............................................. B23K 9/32
[52] U.S. Cl. .................................................. 219/86.25
[58] Field of Search ............... 219/86.25, 86.8, 87, 219/86.7

[56] References Cited

U.S. PATENT DOCUMENTS 4,761,533 8/1988 Naruse et al. ............... 219/86.7
4,985,611 1/1991 Iida et al. ................... 219/87

Primary Examiner—Marvin M. Lateef
Attorney, Agent, or Firm—Finnegan, Henderson, Farabow, Garrett & Dunner

[57] ABSTRACT

A device for working on sheet metal structures, for example the bodies of motor vehicles, to which the structures are fed in succession through a work station. The device has a pair of opposed movable units on either side of the feed path carrying, positioning, clamping and/or welding tools disposed in sets. Each set comprises at least two tools each of which is movable individually between a retracted non-operative position and an operative position so that at any one time, one tool of each set is capable of doing work on a body disposed between the pair of opposed units.

8 Claims, 4 Drawing Sheets

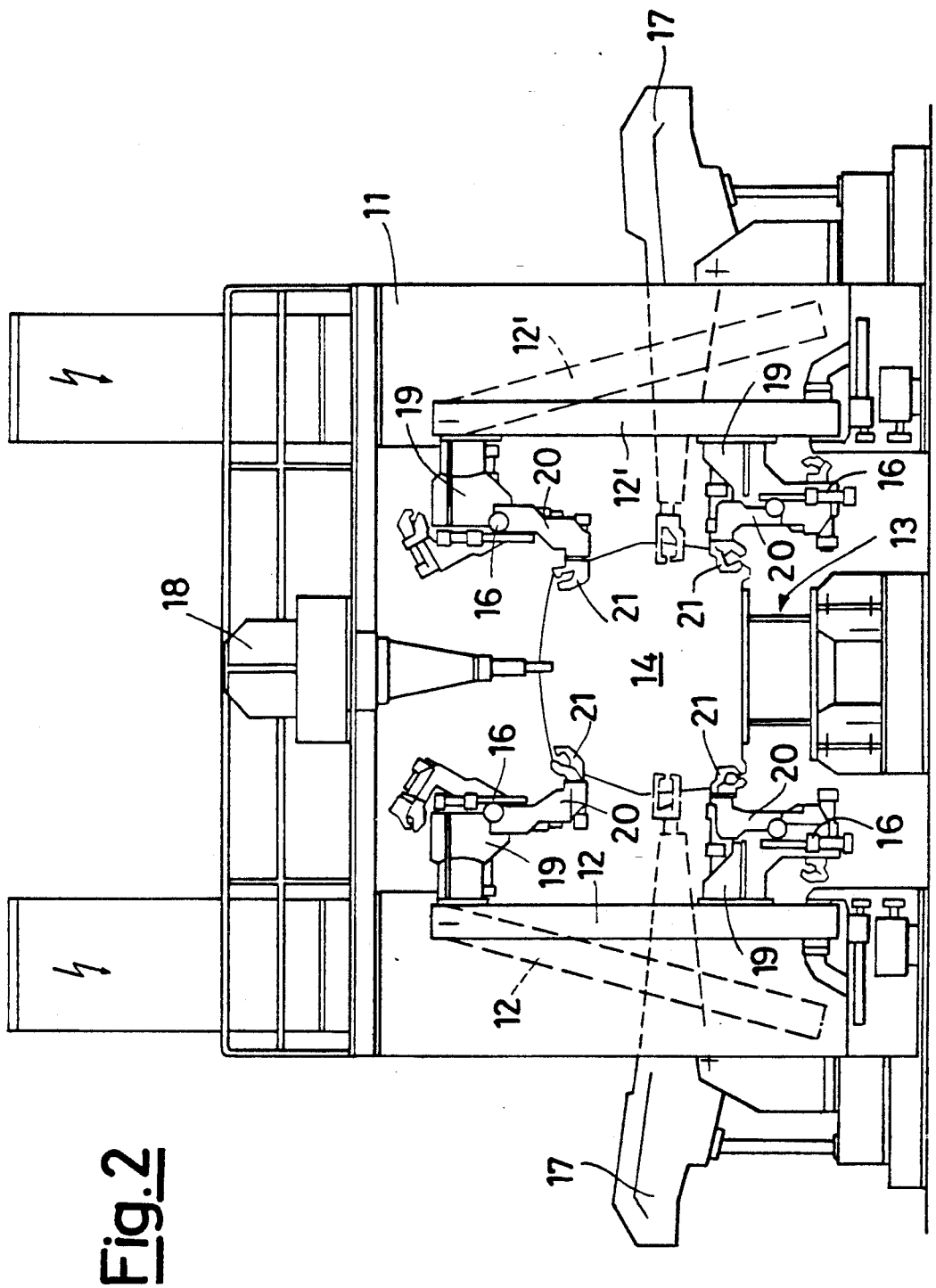

5,081,337

DEVICE FOR WORKING ON SHEET METAL STRUCTURES

BACKGROUND OF THE INVENTION

Automated work stations are known which carry out the operations of fitting and welding together shaped metal sheets and the like to form monolithic structures, such such as, example the bodies of motor vehicles, driver's cabs of trucks and other structures, as for electrical household appliances.

These work stations make use of elements, called "configurations" which consist of a frame supporting centering, clamping and, if necessary, also welding means disposed so as to be able to secure and weld a particular conformation of metal sheet.

The type and arrangement of the devices supported by the configurators depends upon the particular production that the station is used for.

For this reason, in the known technique, in order to make the work stations more flexible, the configurators were made uncoupleable and replaceable these to a small automatic magazine inside the welding station that enables them to adapt quite rapidly to a different model. For example, in the case of the manufacture of car bodies this makes it possible to handle different models, or types of car on the same production line.

In order to make the system even more flexible, work stations have been constructed comprising means for moving the configurators which means are capable of automatically replacing them by taking them from an additional magazine, outside the station, thus making it possible to alternate different models on the production line; models to each of which is associated a particular pair of configurators (in general, the work requires one configurator for each side of the line).

These solutions, however, have various disadvantages such as large dimensions, especially with regard to the magazine, and considerable structural complexity, since they have to move considerable loads (both in weight and in size) and position them with the utmost precision with a relative mechanical apparatus which is always extremely complex and represents an important part of the station. Moreover, in said known systems, moving the configurators, both within the machine, and to and from the additional external magazine, can take a considerable length of time and slow up the production line unless prepositioning is possible.

Furthermore, the intrinsic complexity of the system bears very heavily upon both construction and maintenance costs. The general scope of this invention is to obviate the foregoing drawbacks by means of an automatic system for fitting together shaped metal sheets and the like which, although being able to handle different models of manufactured articles, is structurally simple and compact and offers the possibility of rapidly switching from one model to another and of achieving high output rates.

SUMMARY OF INVENTION

This is achieved by providing a system for working on metal structures, in particular the bodies of motor vehicles, at a work station, said station being provided with tools for manufacturing said structures comprising positioning and clamping means and, if necessary, welding means, said tools being carried by a pair of opposing units, between which said structures are fed in succession, characterized by the fact that each unit comprises a plurality of sets of at least two different tools, each tool in said sets being individually movable from a non-operative retracted position, in which it does not interfere with the structure, to an operative position in which it works on the structure.

BRIEF DESCRIPTION OF THE DRAWINGS

The principles of this invention and its advantages with respect to known techniques will be more clearly understood from the following description of an exemplary embodiment using such principles, with reference to the accompanying drawings, in which:

FIG. 2 is a schematic cross-sectional view taken along line II—II of FIG. 1;

DETAILED DESCRIPTION OF THE INVENTION

Figure 1:
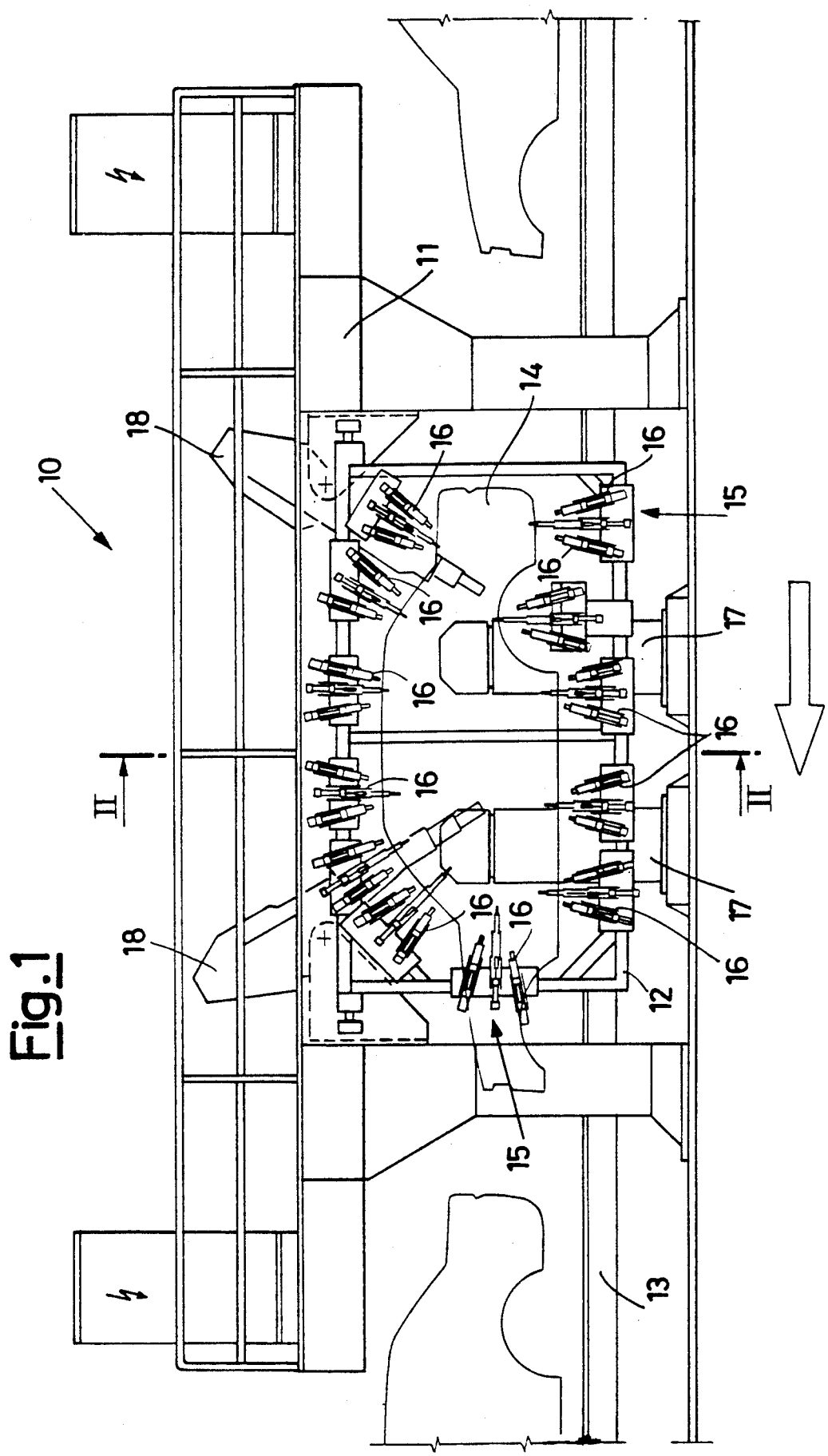
FIG. 1 is a schematic lateral elevation view of a station embodying the device of the invention.

With reference to the drawings, the device at a work station, generically indicated by reference 10 and made according to the invention comprises, as can be seen in FIGS. 1 and 2, a fixed frame 11 supporting a pair of opposed units or frame structures 12, 12' which are movable from a first non-operative position (shown in broken lines in FIG. 2) to a second operative position (shown by the unbroken line in FIG. 2).

The units 12, 12' are made to move around their upper side by means of any known system (for example, an electric motor and a screw and nut screw type kinematic chain) and therefore are not shown in detail nor further described.

As can be clearly seen in FIG. 2, the units 12, 12' are suitably spaced apart so that a conveyor line, generically indicated by reference 13, can pass between them for the programmed feeding of motor vehicle bodies 14 to the station. For the sake of simplicity, the station will be hereinafter described with reference to the welding of said bodies, but it is to be understood that the invention is applicable to working on widely varied articles.

The station also comprises a plurality of floor-mounted welding robots 17 and portal-mounted robots 18 supported, above the body between the opposing units, by the frame 11.

The line 13 and the plurality of robots (if necessary, movable on slides) are per se of the known type and will consequently not be further described. Each unit 12, 12' carries a plurality of sets 15 of elements or tools 16 suitable for working on a body 14 disposed between said units.

The elements 16 are disposed fanwise, each according to its own axis, and are individually controlled.

Figure 3:
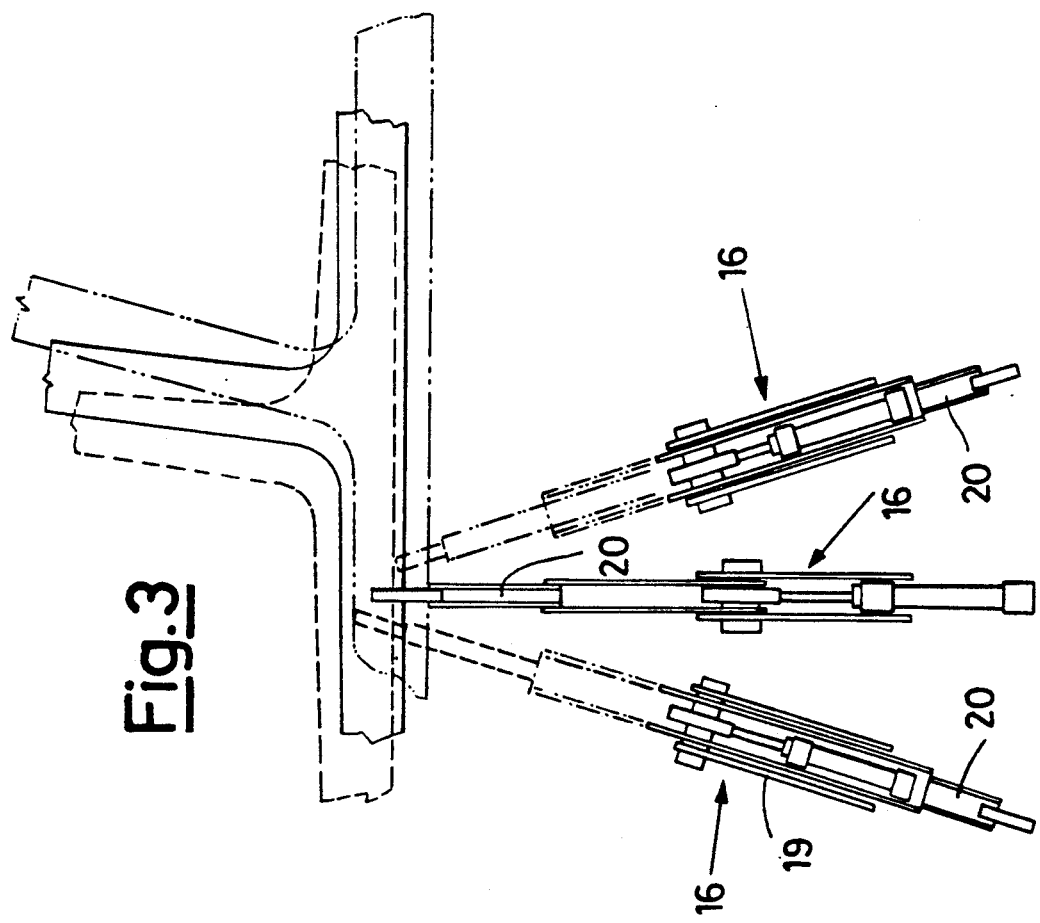
FIG. 3 is a schematic view of a detail of a set of tools for positioning, clamping, or welding.

In the embodiment shown herein each set 15 comprises, as can be most clearly seen in FIG. 3, three tools 16 and the axes of each of them are disposed so as to make them converge in the direction of the body. Each designed to work on a different type of body, as shown schematically in FIG. 3.

As can be more clearly seen in FIG. 2, each tool 16 is composed of a base 19 secured to the unit and of a movable arm 20, carrying positioning, clamping or welding devices 21.

Figure 4:
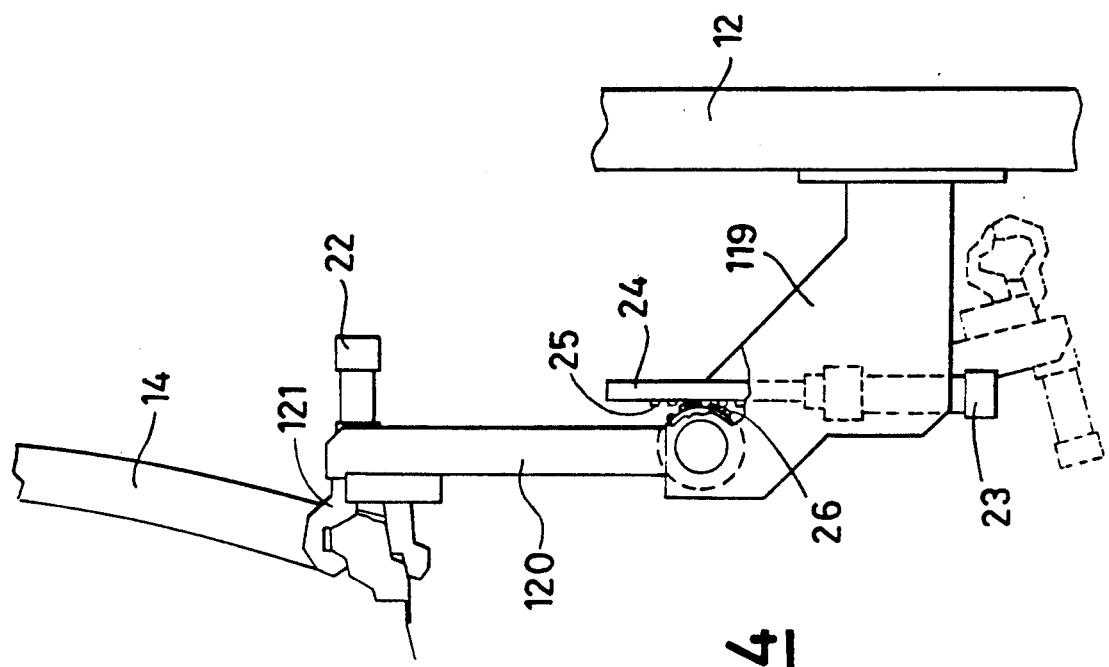
FIG. 4 is a schematic view of a first embodiment of a tool holder arm of FIG. 3.

Each movable arm 20 can be made to move by means of various mechanisms which are readily apparent to any expert in the field. For example, as can be seen in FIG. 4, a possible embodiment of an tool 16 comprises a base 119 connected to a unit 12, and an arm 120 carrying a tool 121 operated by means of an actuator 22. The arm rotates around an axis at one of its ends by means of a linear actuator 23 (of any known type: linear, pneumatic, hydraulic, etc.) whose sliding element 24 carries a plurality of teeth 25 meshing with a toothed wheel 26 integral with the arm 120 so as to form a rackwork. In this way, by operating the actuator it is possible to rotate the arm from a non-operative position (shown by the broken line in FIG. 4) to an operative position (shown by the unbroken line in FIG. 4) for working on the body 14 between the units.

Figure 5:
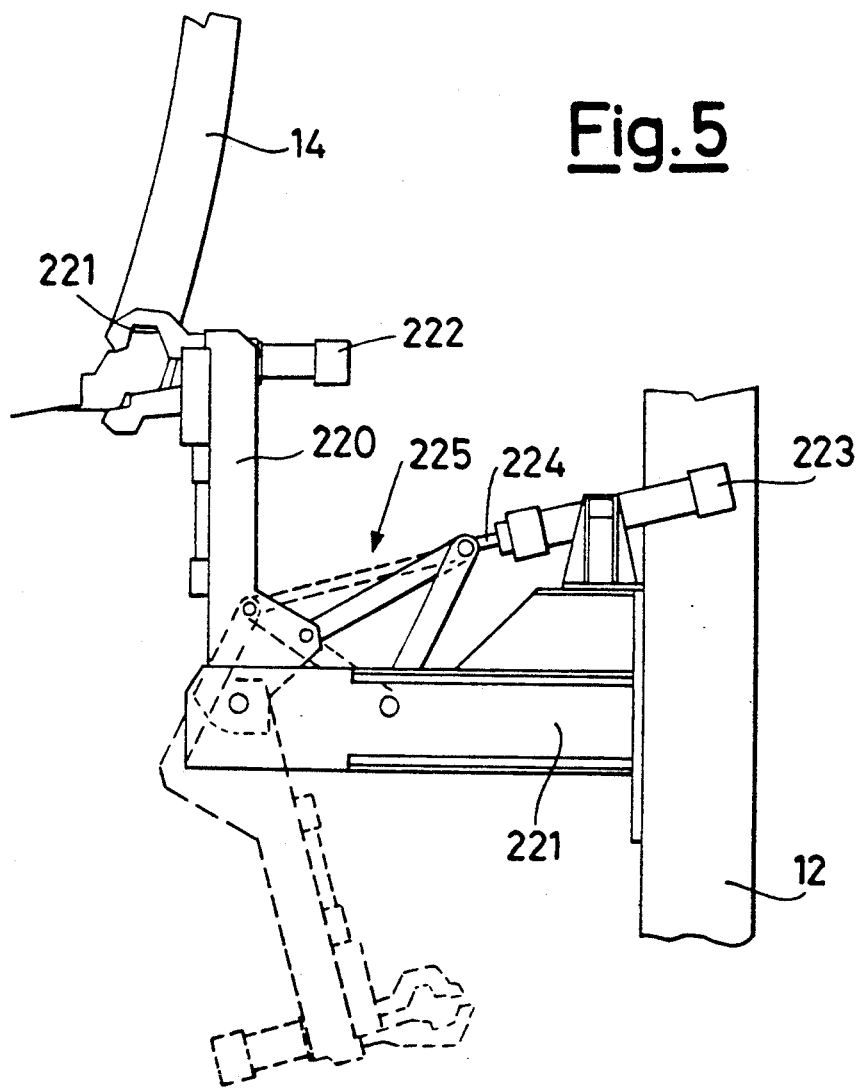
FIG. 5 is a schematic view of a second embodiment of a tool holder arm of FIG. 3.

A second possible embodiment of an tool 16 is shown in FIG. 5. This embodiment comprises a base 219 connected to a unit 12, and an arm 220 carrying a tool 221 operated by means of an actuator 222. The arm rotates around an axis at one of its ends by means of a linear actuator 223 (of any known type: electric, hydraulic, pneumatic) whose sliding element 224 acts upon a toggle structure 225 connected to the arm 220 and to the base 219. In this way by operating the actuator 223 it is possible to rotate the arm from a non-operative position (shown by the broken lines in FIG. 5) to an operative position (shown by the unbroken lines in FIG. 5) to on the body between the opposing units.

The station as described above operates in the following way.

A car body 14 to be worked on is carried by the conveyor system 13 between the units 12, 12' while the latter are in a non operative position, in which none of the elements or tools carried by them can interfere with the movement of the body.

Of the various tools 16 in each set, only those corresponding to the model of car body between the units are tools rotated towards the body while the others are in their rest position.

When the body has reached the correct position between the opposing units, the latter shift into their operative position so that the tools 16 facing towards the body can reach it and work on it as is normal in a work station.

On completion of the operations on the body, the opposing units return to their non-operative position and the conveyor system carries the body away and at the same time replaces it with the next one to be worked on.

If this body is of the same model as the previous one, the cycle described above is repeated with the same operative elements 16. Conversely, if the body is of another model, during the time that elapses between the departure of the body which has just been worked on and the arrival of the next one, the arms of the elements 16 suitable for working on the new body are rotated towards the line and those which are not suitable are rotated outwards into the rest position.

Thus, on arrival of the body, the opposing units are equipped with the clamping, positioning and welding tools suitable for it.

The advantages of a device such as the one described above are clearly evident.

Even though it is able to handle different models of car bodies, it has limited overall dimensions since there are no configurator magazines or relative handling systems. Moreover, the operating time required for changing the layout of the station from one model to another is reduced and contained within the time required for the conveyor line to replace a body between the opposing units without, therefore, there being any delay or waiting cycle along the production line.

Moreover, the particular disposition of the arms of the elements 16 leading off from the perimeter of the configuratiors increases the space available for the floor-mounted robots which can be more rationally disposed and have easier access to the areas to be welded. In particular, the fanwise layout, which puts all the space outside the frame at the disposal of the plurality of tools, also enables the tools to be distributed according to their specific dimensions, thus making it possible to simplify the work of the robots and to obtain less tortuous and complicated movements since it is not necessary for them to avoid the obstacles present on the configurators of known technique.

This makes it possible to use less sophisticated robots, obtain higher output rates and reduce wear and maintenance due to the simplification of the movements.

Lastly, the arms of the robots can be made shorter, thus decreasing vibration; increasing the accuracy of the welding and making it possible to use heavier or larger clamps on them.

It is understood that the embodiment described herein is given merely by way of example in order to illustrate the principles claimed herein and is of the invention not to be considered restrictive thereof. For example, the movable arms 20 can be made with different shapes and kinematisms from those described for achieving the movement from an operative position to a non-operative position, as can be easily imagined by any expert in the field.

The movement of the aforesaid arms 20 to and from said two positions is understood as being rotatory around a real or virtual center of rotation in any position, in particular with an infinite center so as to achieve a purely translational motion.

It is claimed:

1. A device for working on sheet metal structures at a work station through which the structures are fed on a conveyor path, said device comprising a pair of frames for mounting working tools located on either side of the feed path of a structure through the work station and moveable between a non-operative position away from said path and an operative position in which the tools mounted thereon are capable of carrying out work on the structure at the work station, said tools on each frame being grouped into a plurality of sets, each set comprising at least two tools, with each tool in each set being individually moveable between a non-operative, retracted position and an operative position where it can perform work on the structure so that at any one time one tool in each set is capable of working on said structure.

2. The device of claim 1, wherein the tools in any one set are the same and include positioning, clamping or welding tools.

3. The device of claim 2, including at least 3 tools in each set dispersed in a fan like manner and converging in the direction of the structure being worked on.

4. The device of claim 2, wherein each frame comprises a rectangular frame mounted parallel to the feed path and with the plurality of sets of tools being mounted around the perimeter of the frame.

5. The device of claim 4, wherein the frames are pivotally suspended for movement between their non-operative and operative positions.

6. The device of claim 2, wherein each tool includes a base mounted to the frame, a supporting arm pivotally mounted at one end to the base and supporting the positioning, clamping or welding tool at the other end and activating means for moving the arm between said retracted and operative positions.

7. The device of claim 6, wherein said activating means comprises a pinion gear affixed to said arm, a slideable rack engaging said gear and means for moving said rack to rotate said arm between said positions.

8. The device of claim 6, wherein said activating means comprises a pneumatic cylinder connected to said base, the activating rod of the cylinder being operatively connected to said supporting arm through a toggle linkage to rotate said arm between said positions.

* * * * *